May 3, 1960   H. E. DODSWORTH   2,935,166
MOTOR REVERSING MEANS FOR CALCULATING MACHINES
Filed Aug. 14, 1957   4 Sheets-Sheet 1

INVENTOR
HAROLD E. DODSWORTH
BY
ATTORNEY

INVENTOR.
HAROLD E. DODSWORTH
BY
ATTORNEY

May 3, 1960      H. E. DODSWORTH      2,935,166
MOTOR REVERSING MEANS FOR CALCULATING MACHINES
Filed Aug. 14, 1957      4 Sheets-Sheet 3
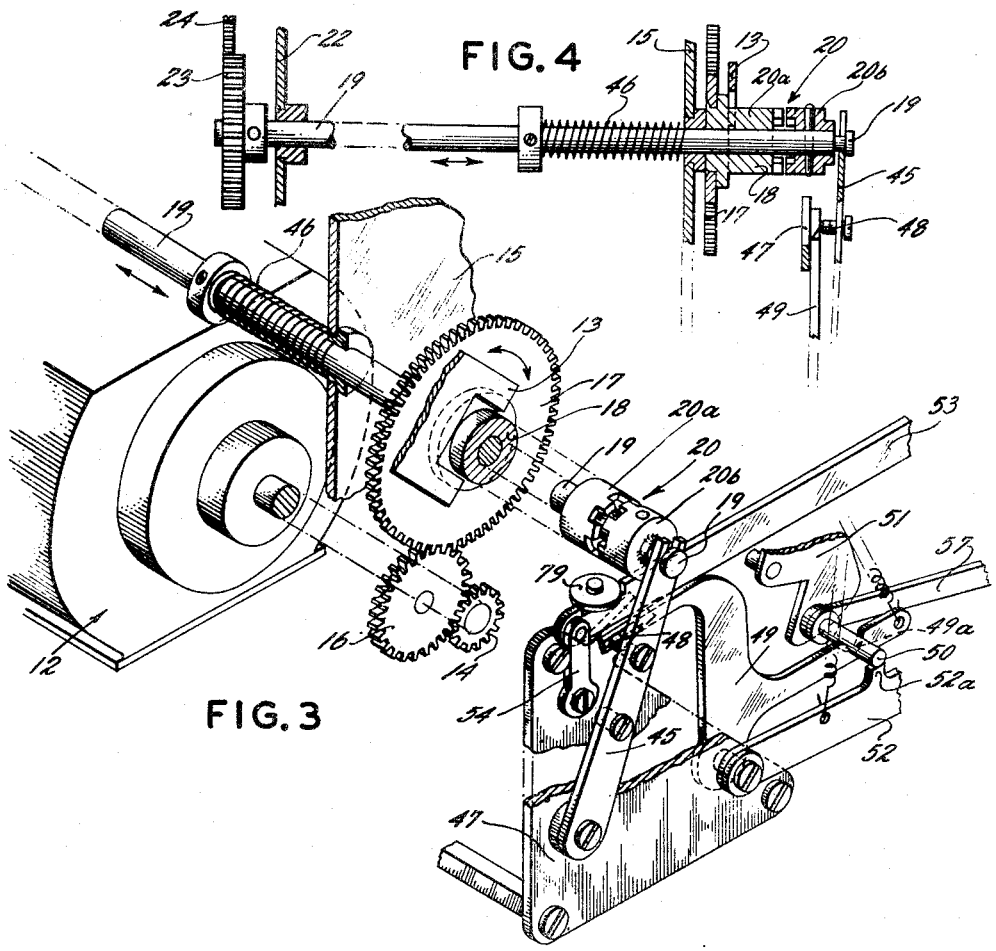
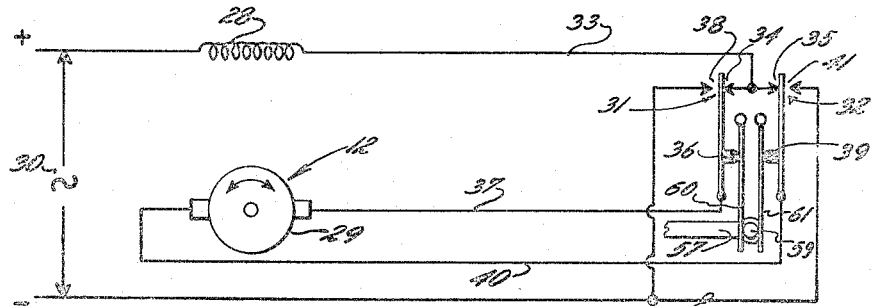
INVENTOR
HAROLD E. DODSWORTH
BY
ATTORNEY May 3, 1960 H. E. DODSWORTH 2,935,166
MOTOR REVERSING MEANS FOR CALCULATING MACHINES
Filed Aug. 14, 1957 4 Sheets-Sheet 4

INVENTOR.
HAROLD E. DODSWORTH
BY
ATTORNEY

United States Patent Office 2,935,166
Patented May 3, 1960

2,935,166
MOTOR REVERSING MEANS FOR CALCULATING MACHINES

Harold E. Dodsworth, Mount Tabor, N.J., assignor to Monroe Calculating Machine Company, Orange, N.J., a corporation of Delaware Application August 14, 1957, Serial No. 678,067

7 Claims. (Cl. 192—.02)

This invention relates to reversible driving means for motor driven calculating machines, and more particularly to means for controlling the direction of rotation of a reversible motor which is adapted to drive a calculating machine forwardly or reversely in accordance with the direction of rotation of the motor.

Prior art motor driven calculating machines having reversible driving means usually employ a unidirectionally driven motor and a reversing clutch or transmission unit to effect the reversal of the driving means. Such a machine is exemplified by the type disclosed in Patent Nos. 2,531,207; 2,620,979, and 2,658,684 to which reference is made for details of structure and operation not described herein.

The machine of the above patents employs a reversing clutch transmission of the planetary type. This type of transmission has proven generally satisfactory. However, it consists of a relatively large number of parts, and precision manufacture and adjustment are required to insure satisfactory performance.

Other motor driven calculating machines having reversible driving means employ a unidirectional clutch to connect the drive to the motor. Use of this type clutch obviously necessitates the provision of a separate reversing unit to control the direction of the drive. This arrangement therefore is also subject to the disadvantages noted above.

It is accordingly the primary object of the invention to provide means comprising a minimum number of parts and yet positive in operation for controlling the reversal of a calculating machine drive by controlling the reversal of a driving motor.

Another and more specific object of the invention is to substitute motor reversing control means for a reversing transmission in a motor driven calculating machine with a minimum of alteration in the design and operation of the machine starting and stopping means.

Other objects and advantages of the invention will be evident from the following description of one embodiment thereof with reference to the accompanying drawings in which:

Fig. 3 is a fragmentary exploded perspective of a portion of the control devices in normal position.

Fig. 4 is a fragmentary longitudinal section through the clutch for engaging the motor drive.

Fig. 5 is an electrical schematic of the motor, and the switching means for controlling the direction of rotation thereof.

Registering mechanism (general operation)

Figure 1:
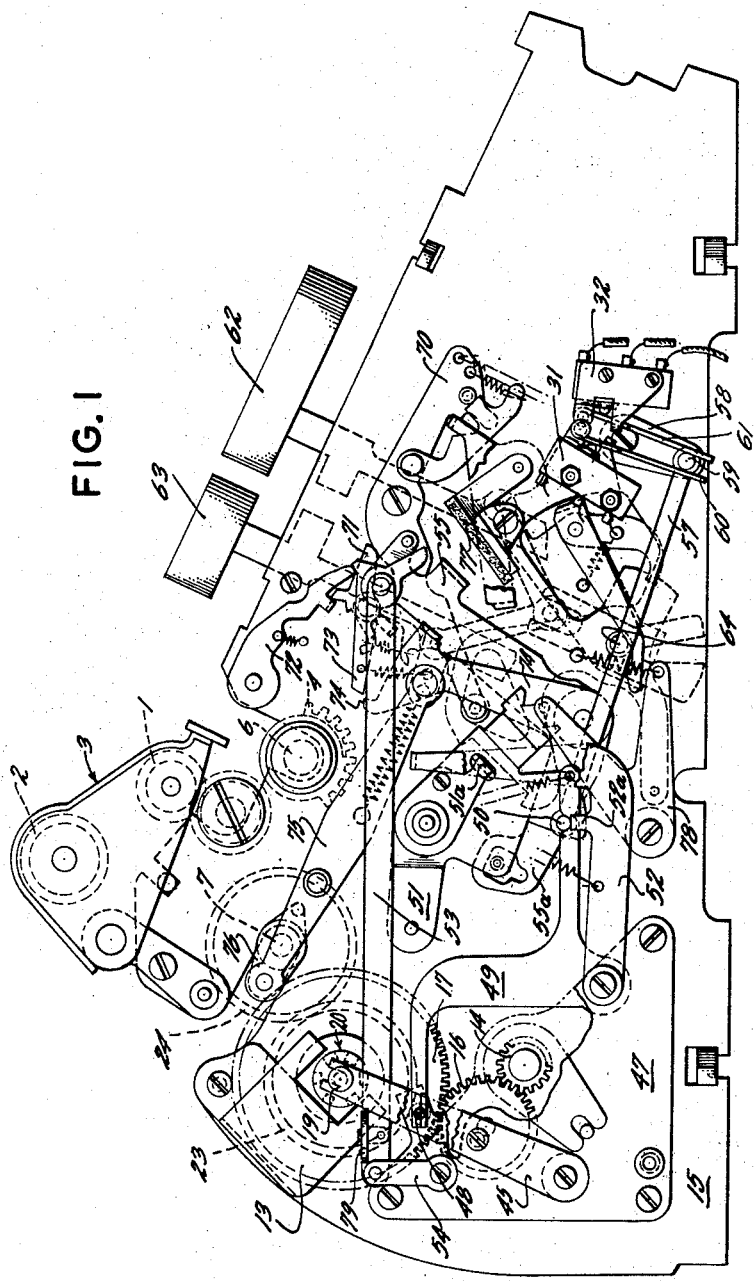
Fig. 1 is a left side elevation of a calculating machine illustrating motor control devices of the invention in normal position.
Figures 2, 6:
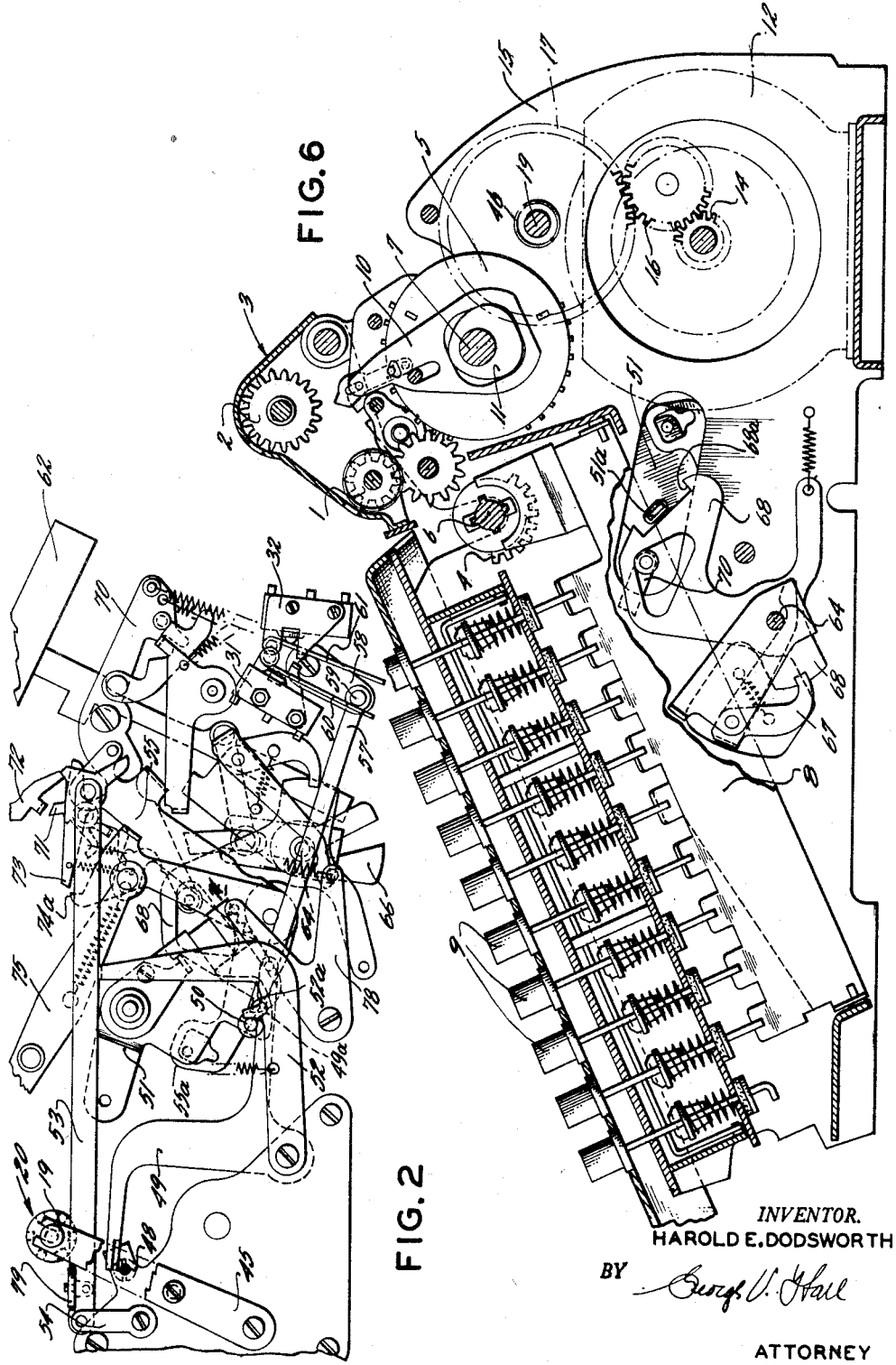
Fig. 2 is a fragmentary detail left side view of the control devices in an operated position.
Fig. 6 is a vertical section through the carriage and keyboard of the machine showing the actuating mechanism.

In the calculating machine, an accumulator register 1 and a counter register 2 are mounted in a denominationally shiftable carriage 3 (Figs. 1, 6). The actuating mechanism for accumulator register 1 comprises differentially settable actuators 4 and tens transfer actuators 5 which are mounted on and driven by transversely extending shafts 6 and 7 respectively in the body of the machine. Differential actuators 4 are settable by selection bails 8 in accordance with the digital values of depressed keys 9 of the keyboard. A counter actuator 10 for counter register 2 is driven by a cam 11 fixed on tens transfer actuator shaft 7.

Shafts 6 and 7 are driven forwardly or reversely by a drive train from a motor 12 (Figs. 3, 5, 6). The drive train comprises a pinion 14 (Figs. 1, 3) fast on the shaft of the motor 12 exteriorly of the machine left side frame 15. Pinion 14 engages an idler gear 16 which engages a spur gear 17. Gear 17 is fast on a sleeve 18 (Figs. 3, 4) which is rotatably mounted on a shaft 19 which extends transversely of the machine. Gear 17 and sleeve 18 are restrained from axial movement on shaft 19 by a plate 13 (Figs. 1, 3, 4) which is mounted on side frame 15 and which has a pair of fingers engaging a flange of sleeve 18 adjacent the outer face of gear 17.

The outer end of sleeve 18 comprises a driving member 20a of a normally disengaged claw clutch designated generally by the numeral 20. The driven member 20b of clutch 20 is fixed at the right end of shaft 19 (Figs. 3, 4) which shaft is adapted for longitudinal movement in the machine side frames to engage and disengage the clutch as later described.

Shaft 19 extends outwardly from the machine right side frame 22 (Figs. 4, 7) and has fixed thereon a gear 23 which engages a gear 24 fast on tens transfer shaft 7. It will be noted that gear 23 is wider than gear 24 to permit longitudinal adjustment of shaft 19 without disengaging the gears. Differential actuator shaft 6 is connected for rotation with tens transfer shaft 7 at a 1 to 1 ratio by a train comprising a gear 25 which meshes with gear 24, a gear 26 which is concentrically mounted and rotates with gear 25, and a gear 27 fast on shaft 6 and engaged by gear 26. Thus upon engagement of clutch 20 and motor 12, actuators 4 and 5 will be rotated forwardly or reversely in accordance with the direction of rotation of the motor shaft.

The reversible motor and circuitry

A type of motor which has been found most readily responsive to reversal and applicable for use with the control devices of the invention is of the universal A.C.–D.C. type. In this type of motor, the armature winding is connected by commutator means in series with the field winding. If the polarity of the connections to the armature winding is reversed with respect to the field winding, the direction of rotation of the motor will be reversed.

Referring now to Fig. 5, motor 12 comprises a field winding 28 and an armature winding 29. The circuit connections to an A.C. or D.C. power source 30 is controlled by a pair of switches generally indicated at 31 and 32 (also Figs. 1, 2). These switches may be any suitable type. However, the well-known microswitch has been found particularly adaptable for this application.

One side of power source 30 is connected through field winding 28 by a lead 33 to a fixed contact 34 of switch 31 and to a fixed contact 35 of switch 32. An adjustable contact 36 is connected through a lead 37 to a commutator brush of armature winding 29. Contact 36 normally engages contact 34 and is adapted to break this contact and to engage a fixed contact 38 which is connected through a lead 42 to the other side of power source 30.

An adjustable contact 39 of switch 32 is connected through a lead 40 to the opposite brush of the commutator of armature 29 and normally engages contact 35. Contact 39 is adapted to break contact 35 and close a contact 41 which through lead 42 is connected to the opposite side of power source 30. Normally both of the commutator brushes of the armature winding 29 are connected by contacts 34, 36 and 35, 39 to the same side of the line through lead 33 and field winding 28 as shown in Fig. 5, whereas the opposite side of the line in disconnected by open contacts 38, 41.

If contact 36 is moved to the left to close contact 38, a motor circuit will be established from one side of the line through lead 42, lead 37, armature winding 29, lead 40, contacts 35, 39, lead 33 and field winding 28 to the other side of the line. Conversely, if contact 39 is moved toward the right to close contact 41, a motor circuit will be established through the armature winding in the reverse direction with respect to the field winding and the motor will be operated accordingly in the reverse direction.

*Mechanism for engaging the drive train and the motor*

Shaft 19 (Figs. 3, 4), on which driven clutch element 20b is mounted, is biased toward the left by a compression spring 46 which engages the inner face of side frame 15 and a collar fixed on said shaft. Shaft 19 and clutch element 20b, however, are normally held toward the right against the tension of spring 46. Clutch 20 therefore is normally disengaged, as shown in Figs. 3, 4.

To maintain clutch 20 in normally disengaged position against the tension of spring 46, the upper forked end of a depending arm 45 engages a recessed stud at the outer end of clutch element 20b. Arm 45 extends downwardly and is loosely mounted at its lower end on the outer face of a plate 47 which is spaced outwardly from the machine left side frame 15. The upper forked end of arm 45 therefore, because of the loose mounting at its lower end, may be moved transversely of the machine thereby axially adjusting shaft 19 and clutch element 20b. Normally, the upper end of arm 45 is held transversely toward the right (Figs. 3, 4) by engagement of a stud 48 intermediate its ends with a rearwardly extending arm of a crank 49 which is fulcrumed on the inner face of plate 47. Clutch element 20b will therefore normally be held toward the right in clutch disengaging position.

Crank 49 is spring biased counterclockwise (Figs. 1, 2, 3) and has a forwardly extending arm provided at its upper edge with a cam recess 49a which is normally engaged by a pin 50 which holds crank 49 in the counterclockwise position shown in Figs. 1, 3. Pin 50 is mounted on a lower extension of a lever 51 which is pivotally mounted on the machine left side frame 15.

A forwardly extending arm 52 has common pivotal mounting with crank 49 on plate 47. Arm 52 is spring biased counterclockwise and has at its upper edge a lug 52a which normally engages the underside of pin 50 of lever 51. Arm 52 is bent at right angles at its front end and extends upwardly to terminate normally in spaced relation (Fig. 1) below the lower edge of a horizontal link 53. Link 53 is pivotally supported at its rear end at the upper end of a crank 54 which is pivotally mounted at its lower end on plate 47 to the rear of arm 45, and at its front end it has pivotal connection with the upper end of a stop arm 55 which extends downwardly and is fulcrumed on the machine left side frame 15. Arm 55 is normally spring held counterclockwise against a suitable stop (not shown) thereby holding link 53 toward the rear.

A link 57 (Figs. 1, 2, 3) is pivotally mounted at its rear on pin 50 of lever 51 and extends forwardly where it has pivotal connection at its front end with the depending end of a crank 58. At the pivotal connection of link 57 with crank 58 is a pin 59 which extends outwardly between the lower ends of a pair of arms 60, 61. Arms 60, 61 are pivotally mounted at their upper ends between microswitches 31, 32 and arm 60 engages a stud on switch contact 36 while arm 61 engages a stud on switch contact 39 (Fig. 5).

Means later described is adapted to rock lever 51 clockwise or counterclockwise and this will engage clutch 20 and close the motor circuit. Upon clockwise movement of lever 51 (Fig. 2), pin 50 will be moved from engagement with recess 49a of crank 49 thereby rocking said crank clockwise. Clockwise movement of crank 49 will raise the rearward extension of said crank from engagement with stud 48 of arm 45 thereby releasing said arm so that its upper end may be moved toward the left (Figs. 3, 4). Spring 46 will therefore be effective to move shaft 19 and clutch element 20b to the left to engage clutch 20. Simultaneously with this operation, the clockwise movement of lever 51 will move link 57 and pin 59 toward the rear. Pin 59 therefore will rock arm 60 clockwise thereby operating switch contact 36 (Fig. 5) to disengage contact 34 and engage contact 38. The motor circuit therefore will be closed as previously described and the motor drive will be operated in the direction to effect additive rotary operation of actuators 4, 5 (Fig. 6).

Lug 52a of arm 52 is operable to lock lever 51 positively in clockwise operated position. Upon clockwise movement of lever 51, pin 50 thereof will be moved to the rear of lug 52a. Arm 52 accordingly will be rocked counterclockwise by its spring to position lug 52a forwardly of pin 50 (Fig. 2) thereby holding lever 51 in clockwise operated position. Furthermore, upon clockwise movement of arm 52 its upwardly extending end will be moved immediately adjacent the lower edge of link 53. This will position the parts for the stopping operation later described.

Upon counterclockwise movement of lever 51 either from normal centralized position or from operated clockwise position through normal position, the parts will be operated as described above to engage clutch 20. Link 57, however, will be moved forwardly by counterclockwise movement of lever 51 and this will engage the motor drive for reverse subtractive registration. Upon forward movement of link 57, pin 59 will rock arm 61 (Fig. 5) counterclockwise thereby operating switch contact 39 to disengage contact 35 and engage contact 41. This will establish the motor circuit but the polarity of the armature winding will be reversed with respect to the field and the motor therefore will be operated in reverse direction to drive actuators 4, 5 subtractively.

*Plus and minus bar control*

Lever 51 is controlled by plus and minus bars 62, 63 (Figs. 1, 2, 7) substantially as disclosed in Patent 2,096,465 to which reference is made for operational details not disclosed herein. In this patent, the lever corresponding to lever 51 of the present application is operable in connection with control of a reversing planetary clutch mechanism. The operation, however, with respect to the plus and minus bars is substantially the same as the operation of the present disclosure. Furthermore, stopping means which is operable as later described to centralize lever 51 is operable substantially as disclosed in the above said patent.

Depression of plus bar 62 or minus bar 63 (Fig. 7) will rock a shaft 64 clockwise or counterclockwise respectively through linkage 65 and a crank 66. Shaft 64 extends across the machine and has coupling connection 67 with a spring centralized setting plate 68 at the inner side of the left side frame 15. Plate 68 therefore will be rocked counterclockwise (Figs. 1, 2) upon depression of plus bar 62 and clockwise upon depression of minus bar 63.

Setting plate 68 is provided with a pair of opposed shoulders 68a adapted respectively for engagement with an inwardly extending lug 51a when said plate is rocked from centralized position. Therefore upon depression of plus bar 62, a shoulder 68a of plate 68 will rock lever 51 clockwise (Figs. 1, 2) to engage clutch 20 and the motor drive for additive registration and upon depression of minus bar 63, the lever will be rocked counterclockwise to engage the clutch and motor drive for negative registration.

*Full cycle stopping means*

Means settable upon depression of plus bar 62 or minus bar 63 (Figs. 1, 2) is operable, upon release of the depressed bar, to stop the registering mechanism in full cycle position at the end of the current registering cycle. When setting plate 68 is rocked, upon depression of the plus or minus bar, one or the other of a pair of opposed cam faces thereof will rock and hold a spring retracted lever 70 counterclockwise as shown in Fig. 2. A pawl 71 mounted intermediate the rear arm of lever 70 is spring urged counterclockwise. However, when lever 70 is in normal clockwise position, a suitable limit pin (not shown) holds pawl 71 in the clockwise position of Fig. 1. When lever 70 is rocked counterclockwise, pawl 71 will be moved away from the stop pin and an upwardly extending lug of said pawl will be rocked counterclockwise into position beneath a downwardly extending lug of a trigger 72 as shown in Fig. 2.

Trigger 72 normally engages a lug at the upper edge of pawl 73 which is spring urged counterclockwise and which is mounted on the upper end of stop arm 55. A rock arm 74 has common pivotal mounting with stop arm 55 and is reciprocally driven in time with the actuating mechanism by a link 75 and a crank 76 which is fixed on tens transfer shaft 7.

Upon release of plus bar 62 or minus bar 63, setting plate 68 will be centralized and lever 70 will be spring retracted clockwise to normal thereby engaging the lug of pawl 71 with the lug of trigger 72 to raise said trigger and release pawl 73. As the parts approach full cycle position, a shoulder 74a at the upper end of rock arm 74 will engage the rear end of released pawl 73. This will couple arm 55 for simultaneous clockwise rocking movement with arm 74. Arm 55 therefore will be carried against a stop 77 to arrest a movement of the parts in their overrun beyond full cycle position.

As arm 55 is carried to stop 77, a cam slot of a rear extension 55a of said arm will engage a pin of lever 51 thereby centralizing said lever in which position it will be held by a suitable click pawl 78. Furthermore, upon movement of arm 55 to stop 77, link 53 will be moved toward the front of the machine. This movement of link 53 will occur immediately before the cam opening of extension 55a of arm 55 is effective to centralize lever 51. In the forward movement of link 53, its forward end will be lowered by the clockwise downward movement of arm 55. The lower edge of link 53 therefore will engage the upper extension of arm 52 and rock said arm clockwise. Clockwise movement of arm 52 will remove lug 52a from latching position with respect to pin 50. Lever 51 therefore will be released for the normalizing operation above described.

Mounted at the upper edge of link 53 normally immediately to the rear of arm 45 (Figs. 1, 2, 3) is a roller 79. When link 53 is moved forwardly, roller 79 will engage the inner face of arm 45 thereby moving said arm outwardly at its upper end from plate 47. This will move clutch element 20b and shaft 19 on which it is fixed to the right to the position of Figs. 3, 4 against the tension of spring 46 thereby disengaging clutch 20. Simultaneously with this operation and during which lever 51 is centralized, pin 50 will reengage cam recess 49a thereby permitting crank 49 to be spring restored counterclockwise from the position of Fig. 2. Movement of crank 49 to normal will position the rearwardly extending arm thereof to the rear of stud 48.

Figure 7:
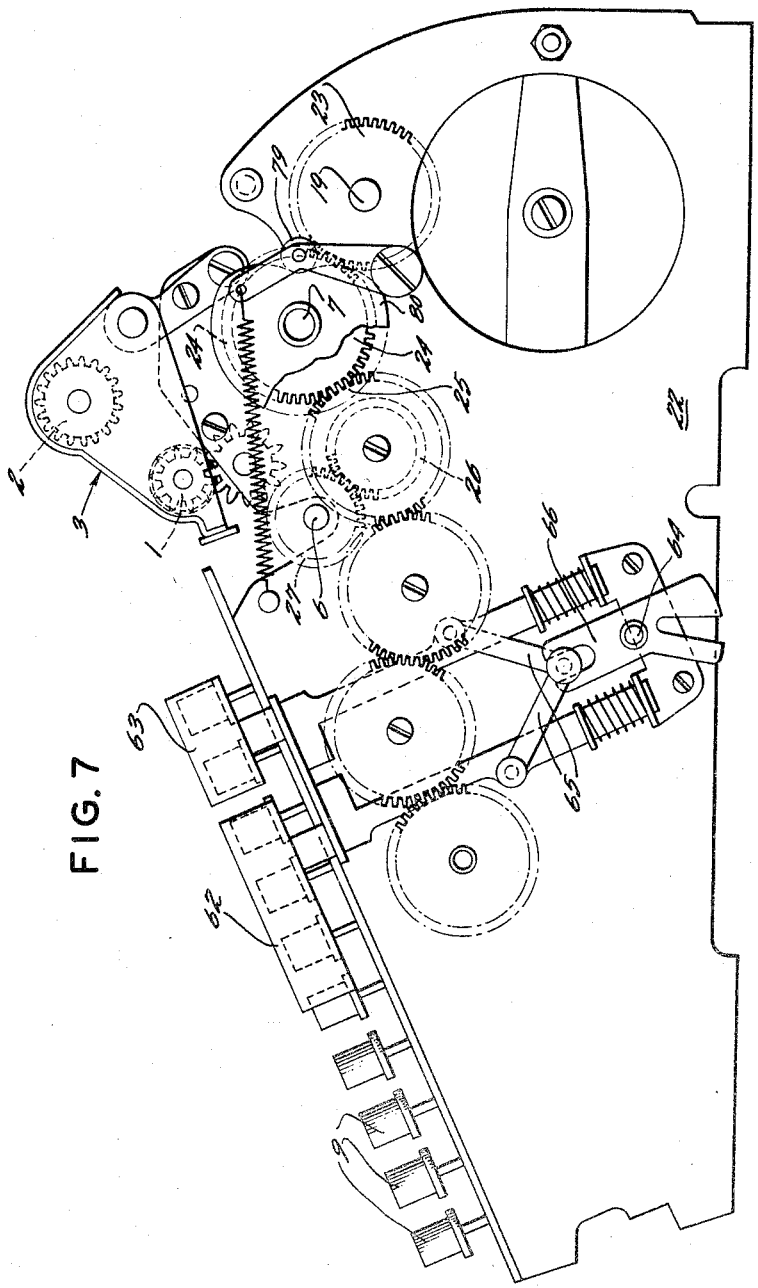
Fig. 7 is a right side elevation of the machine showing the plus and minus bars.

Upon rebound of arms 55, 74 from stop 77, link 75 and crank 76 will operate the actuator drive train reversely to move actuators 4, 5 to full cycle position where they will be located by a locator cam 80 (Fig. 7). Furthermore, upon rebound of arm 55, link 53 will be moved to the rear thereby moving roller 79 from engagement with arm 45 and releasing said arm. However, the rear extension of crank 49 will be in position for engagement by stud 48 and arm 45 therefore will be restrained from movement toward position to engage clutch 20. Also upon rebound of the parts, pawl 71 having been moved to normal in its tripping operation by the stop pin, will permit trigger 72 to reengage pawl 73 thereby disconnecting arms 55, 74. Upon normalizing movement of lever 51, link 57 will centralize pin 59 with respect to microswitches 31, 32 and therefore power source 30 will be disconnected from the motor 12.

In the aforenoted Patent 2,531,207, a lever corresponding to lever 51 of the present application is operable in connection with control of a reversing planetary clutch mechanism. This lever is controlled by division control means to determine the sign of registration, and alternatively to determine the direction of operation of carriage shifting mechanism. It will be apparent that control of the adjustment of lever 51 of the present invention may be effected in a division program substantially in accordance with Patent 2,531,207.

Although the reversible motor is disclosed as driving reversible registering mechanism, it will be obvious that the invention is equally applicable to the control of the motor to drive other reversibly operable calculating machine components, e.g., carriage shifting mechanism. Furthermore, it will be understood that the invention is not restricted to the control of the particular type of motor herein disclosed.

I claim:

1. In a calculating machine having a reversibly operable drive train; a reversible electric motor, a first circuit for operation of said motor in a given direction, a second circuit for operation of said motor in the reverse direction, switching means adjustable to a first position to close said first circuit, to a second position to close said second circuit and to a third position wherein both of said circuits are broken, a clutch for connecting said motor to said drive train, starting means operable to adjust said switching means alternatively to said first and second circuit closing positions and to engage said clutch, and stopping means operable to disengage said clutch and to adjust said switching means to circuit breaking position.

2. In a calculating machine having a reversibly operable drive train; a reversible electric motor, a first circuit for operation of said motor in a given direction, a second circuit for operation of said motor in the reverse direction, switching means adaptable to a first position to close said first circuit, to a second position to close said second circuit and to a third position wherein both of said circuits are broken, a clutch for connecting said motor to said drive train, a first key and a second key, starting means operable to engage said clutch upon depression of either of said first and second keys and to adjust said switching means to said first and second positions respectively, and stopping means operable in response to retraction of either of said keys to disengage said clutch and to adjust said switching means to said circuit breaking position.

3. In a calculating machine having a reversibly operable drive train; a reversible electric motor, a first circuit for operation of said motor in a given direction, a second circuit for operation of said motor in the reverse direction, switching means adjustable to a first position to close said first circuit, to a second position to close said second circuit and to a third position wherein both of said circuits are broken, a clutch for connecting said motor to said drive train including a clutch element adjustable to clutch engaging and disengaging positions and spring urged to engaging position, a blocking member normally located in position to block said element from movement to clutch engaging position and adjustable to release said element, starting means operable to adjust said switching means alternatively to said first and second circuit closing positions and to adjust said blocking member from blocking position, and stopping means operable to disengage said clutch, restore said blocking member and to adjust said switching means to circuit breaking position.

4. In a calculating machine having a reversibly operable drive train; a reversible electric motor, a first circuit for operation of said motor in a given direction, a second circuit for operation of said motor in the reverse direction, switching means adjustable to a first position to close said first circuit, to a second position to close said second circuit and to a third position wherein both of said circuits are broken, a clutch for connecting said motor to said drive train, a control member adjustable in one and in the opposite direction from a normally centralized position, means operable upon adjustment of said control member in said one and in said opposite direction to adjust said switching means to said first and to said second positions respectively and upon adjustment of said control member to centralized position operable to adjust said switching means to said third position, clutch control devices effective when said control member is in central position to maintain said clutch in disengaged position and operable upon movement of said control member from central position to engage said clutch, and stopping means operable to disengage said clutch and to centralize said control member.

5. In a calculating machine having a reversibly operable drive train; a reversible electric motor, a first circuit for operation of said motor in a given direction, a second circuit for operation of said motor in the reverse direction, switching means adjustable to a first position to close said first circuit, to a second position to close said second circuit and to a third position wherein both of said circuits are broken, a clutch for connecting said motor to said drive train including a clutch element adjustable to clutch engaging and disengaging position and spring urged toward engaging position, a blocking member normally located in position to block said element from movement to clutch engaging position and adjustable to release said element, a control member adjustable in one and in the opposite direction from a normally centralized position, means operable upon adjustment of said control member in said one and in said opposite direction to adjust said switching means to said first and said second positions respectively and upon adjustment of said control member to centralized position operable to adjust said switching means to said third position, means operable upon adjustment of said control member in either of said directions to adjust said blocking member from blocking position, and upon adjustment of said control member to centralized position operable to restore said blocking member, and stopping means operable to move said clutch element to clutch disengaging position and to centralize said control member.

6. In a calculating machine having a cyclically and reversibly operable drive train, and full cycle stopping means for said drive train including means providing for overrun of said drive train in either direction beyond full cycle position and reverse movement to full cycle position; a reversible electric motor, a first circuit for operation of said motor in a given direction, a second circuit for operation of said motor in the reverse direction, switching means adjustable to a first position to close said first circuit, to a second position to close said second circuit and to a third position wherein both of said circuits are broken, a clutch for connecting said motor to said drive train, starting means operable to adjust said switching means alternatively to said first and second circuit closing positions and to engage said clutch, and means operable upon overrun of said drive train beyond full cycle position in a stopping operation to disengage said clutch and to adjust said switching means to circuit breaking position.

7. In a calculating machine having a cyclically and reversibly operable drive train, and full cycle stopping means for said drive train including means providing for overrun of said drive train in either direction beyond full cycle position and reverse movement to full cycle position; a reversible electric motor, a first circuit for operation of said motor in a given direction, a second circuit for operation of said motor in the reverse direction, switching means adjustable to a first position to close said first circuit, to a second position to close said second circuit and to a third position wherein both of said circuits are broken, a clutch for connecting said motor to said drive train including a clutch element adjustable to clutch engaging and disengaging positions and spring urged toward engaging position, a blocking member normally located in position to block said element from movement to clutch engaging position and adjustable to release said element, starting means operable to adjust said switching means alternatively to said first and second circuit closing positions and to adjust said blocking member from blocking position, and means operable upon overrun of said drive train beyond full cycle position in a stopping operation to disengage said clutch, restore said blocking member and to adjust said switching means to circuit breaking position.

References Cited in the file of this patent
UNITED STATES PATENTS

| | | |
|---|---|---|
| 1,416,974 | Piscicelli | May 23, 1922 |
| 1,668,880 | Vallen | May 8, 1928 |